May 6, 1958 A. A. BERNARD 2,833,913
TORCH FOR GAS SHIELDED METAL ARC WELDING
Filed April 8, 1957 3 Sheets-Sheet 3
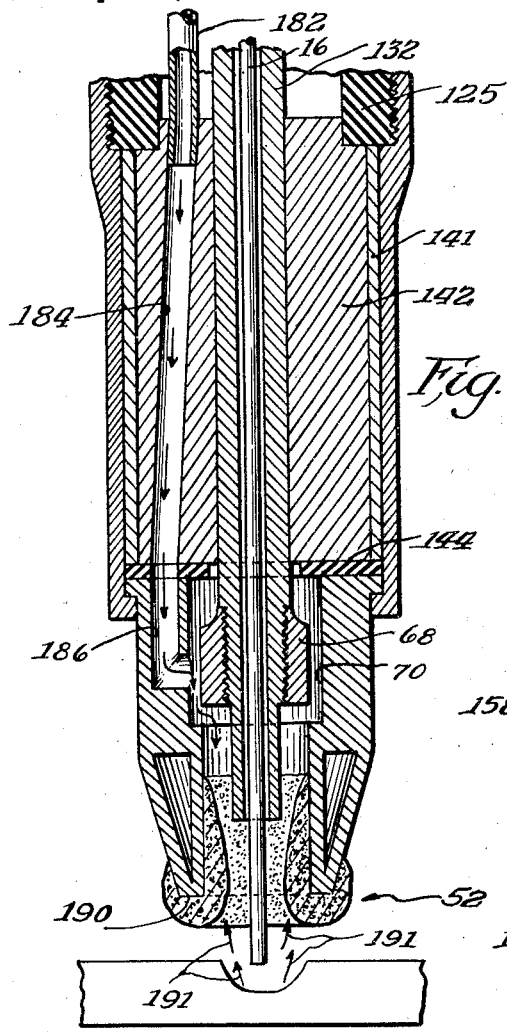
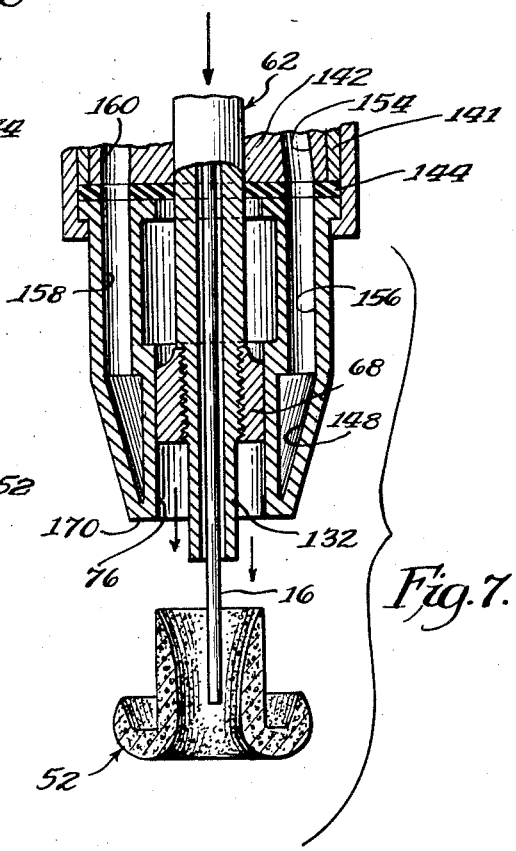
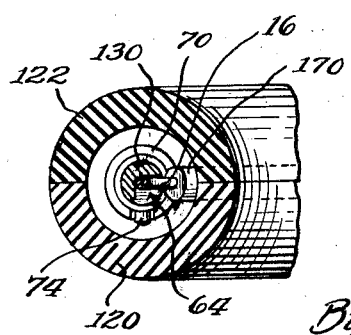
Inventor
Arthur A. Bernard
By
Mann, Brown and McWilliams
Attys.

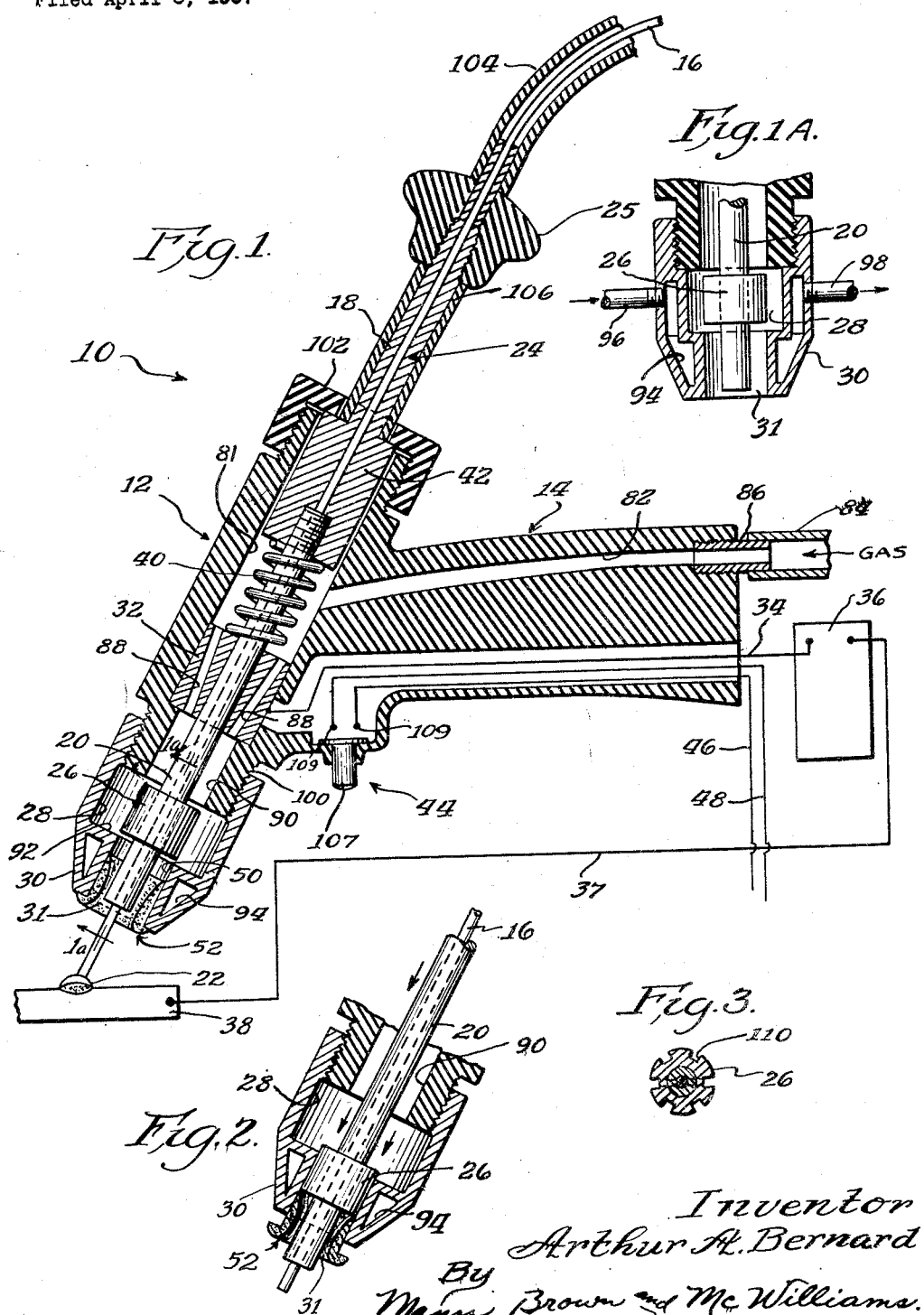

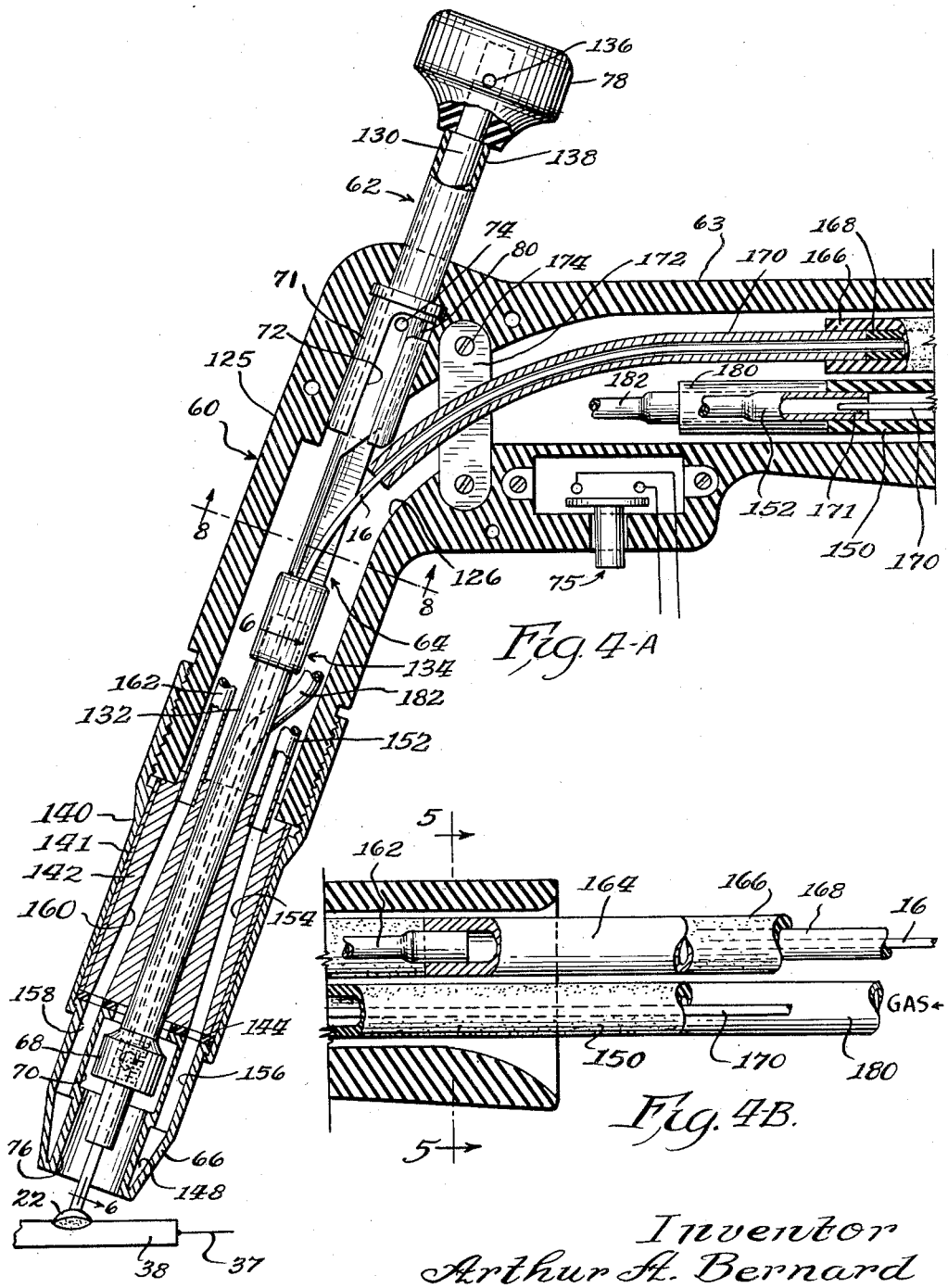

United States Patent Office 2,833,913
Patented May 6, 1958

2,833,913

TORCH FOR GAS SHIELDED METAL ARC WELDING

Arthur A. Bernard, Chicago Heights, Ill.

Application April 8, 1957, Serial No. 651,282

14 Claims. (Cl. 219—130)

This invention relates to arc welding and more particularly to a welding torch used for applying the process generally referred to as gas-shielded consumable-electrode arc welding.

In practicing this type of welding process, the welding electrode is fed continuously to the arc from a coil by an appropriate electrode feeding machine. Directly adjacent to the arc, the electrode passes through a welding gun or torch which performs a number of functions; the major functions are that the gun or torch provides the means for directing the arc at the tip of the electrode along the course of welding, it provides the means for energizing the electrode with welding current, and it provides and directs an annular flow of gas down over the arc, thus shielding the arc and the molten weld metal from harmful ambient air.

To insure high quality welds it is important that the thickness of the annular gas stream which flows from the mouth of the gas nozzle down over the arc be ample to prevent ambient air from penetrating through it; otherwise the electrode metal becomes oxidized as it transfers through the arc. The thickness of the annular gas stream is governed by the size of the mouth or hole in the nozzle from which the shielding gas flows. For instance, the minimum size hole required for adequate shielding of an arc drawn from the tip of a $1/16$ inch diameter electrode is $1/2$ inch, in which case this size nozzle produces a gas shield $7/32$ inch thick around the electrode directly at the mouth of the nozzle and this thickness increases as the annular gas stream leaves the confinement of the nozzle to flow down over the arc column. If the volume of welding current used for depositing the $1/16$ inch size electrode is less than that considered average current, the hole in the nozzle may be slightly smaller than $1/2$ inch, and somewhat larger than $1/2$ inch if unusually high current densities are used. It suffices to say that the size of the hole in the gas nozzle must not be smaller than that found by actual test to be adequate for proper shielding, and it is obvious that should the size of the hole become gradually smaller during welding, then the quality of the weld would in turn be reduced. Yet, heretofore, this is exactly what has happened when the gas-shielded consumable-electrode process has been used for welding common steel.

The reason why the hole in the nozzle becomes smaller during welding and at a very rapid rate, is because all during welding, weld metal in the form of minute globules is constantly being erupted up out of the crater as the crater is formed by the jet action of the arc, and as the hole or mouth of the nozzle is always directly over the crater, a large portion of the splashed out metal, generally referred to as weld spatter, becomes attached to the inside wall of the nozzle. In preparing data to support the value of the invention disclosed herein, a series of tests were made in which all prominent makes of common steel electrodes were tested and the results were as follows: All electrodes tested were $1/16$ inch diameter and these were fed to a 375 ampere arc maintained at 30 volts. With this current, the average rate of electrode consumption was 350 inches per minute. Carbon-dioxide gas was used as the gas shielding medium and was fed to the arc at a rate of $66/100$ cubic feet per minute through a nozzle with a $1/2$ inch diameter hole or mouth. Depending on the particular make of electrode, the time required for $1/32$ inch thickness of metal spatter to accumulate within the hole of the nozzle, reducing its size from $1/2$ inch to $7/16$ inch, varied from $1/4$ minute to three full minutes. Therefore, as it is known by tests that the critical minimum nozzle hole or mouth size for this particular welding procedure as $7/16$ inch, it was necessary during the tests to stop welding and remove the accumulated spatter from within the nozzle every minute or two.

Heretofore, the most common method used for removing the accumulated metal spatter from within the hole of the nozzle has been by scraping it out with the end of a screw driver. Needless to say, this is a time consuming operation and one that is carried out by a certain percentage of welding operators in a hit and miss fashion. Actually, if the accumulation is not completely removed and a small patch remains attached within the hole, this produces a turbulence in the gas flow, and ambient air becomes mixed with the gas as it leaves the mouth of the nozzle; also, the annular stream is deflected sidewise and therefore is not uniformly distributed around the arc.

In some cases welding operators are provided with a hand-reamer for reaming out the hole of the nozzle from outside the nozzle. As the electrode extends down through the center of the nozzle, through said nozzle hole, and beyond its end, the reamer must be hollow so that it can be worked inside the nozzle. The use of such a reamer is much more efficient and positive in its cleaning action than the use of a single pointed instrument such as the end of a screw driver or pick; nevertheless, as mentioned above, the time required to remove the spatter from within the hole is such that this otherwise high speed arc welding process offers no advantage as compared to the much slower electrode metal depositing rate of the conventional manually applied flux-coated electrode processes.

One of the main objects of this invention is to provide a welding torch for gas-shielded consumable-electrode arc welding which has a ramrod and reamer device incorporated in its construction for removing metal spatter from within the gas nozzle hole and from around the rim of the gas nozzle.

Another equally important object is to provide a means in the design of the torch for removing accumulated metal spatter from within the hole or mouth of the nozzle in just two or three seconds of time, thus leaving much more of the welding operators' time for productive work.

Still another very important object is to provide a means in the construction of the torch for thoroughly removing all and not just a portion of the metal spatter within the hole of the nozzle by cleaning the nozzle from the inside out and not from the outside in, thus insuring an adequate annular thickness of shielding gas free of turbulence, and thus insuring high quality welds.

Yet another object of the invention is to provide a torch for gas shielded metal arc welding that is economical of manufacture, convenient in use, and readily adapted for a wide variety of welding operations.

Other objects, uses, and advantages will be obvious or become apparent upon a study of the following detailed description and the accompanying drawings.

In the drawings:

Figure 1 is a diagrammatic cross sectional view of a welding torch in which one embodiment of my invention has been incorporated;

Figure 1a is a cross sectional view along line 1a—1a of Figure 1;

Figure 2 is a fragmental cross sectional view of the welding torch nozzle and associated structures which, together with Figure 1, illustrates the operation of the welding spatter cleaning device illustrated in Figure 1;

Figure 3 is a cross sectional view through the piston or reamer head, illustrating a modified form thereof;

Figures 4A and 4B are composite cross sectional views that taken together are a view similar to that of Figure 1, but illustrating a modified form of the invention, parts being omitted or broken away for clarity of illustration;

Figure 5 is a cross sectional view along line 5—5 of Figure 4B;

Figure 6 is a diagrammatic cross sectional view along line 6—6 of Figure 4A;

Figure 7 is a cross sectional view through the torch nozzle of the torch of Figures 4A and 4B, which, together with Figure 4A, illustrates the operation of the weld spatter cleaning device of this form of the invention; and Figure 8 is a diagrammatic cross sectional view along line 8—8 of Figure 4A.

General description

In accordance with the principles of my invention, I provide a welding torch having a reamer device mounted therein which permits the welding operator to clean out the welding nozzle mouth or hole from the inside of the torch. The drawing figures illustrate several specific embodiments of my invention.

In the embodiment of the invention shown in Figure 1, reference numeral 10 generally indicates a welding torch including a body 12, formed of insulating material, that in turn includes a handle 14. The electrode 16 is fed from a reel by an appropriate electrode feeding mechanism (not shown) into an upper guide tube 18 slidably mounted in the rear of the torch, and from the upper guide tube 18 it passes into a lower guide tube 20 slidably mounted adjacent the middle of the torch. From the lower end of the guide tube 20 the electrode passes into the arc 22. The guide tubes 18 and 20 together comprise a tubular ramrod 24, which includes a knob or handle 25 at its outwardly extending end. A piston or reamer head 26, which is slightly smaller in size than the nozzle mouth, is mounted on the lower end of the ramrod 24, within the chamber or cavity 28 of the torch nozzle 30 that is adjacent the nozzle hole or mouth 31. The ramrod 24 is slidably mounted, though snugly received, in copper bushing 32 to which one lead 34 from welding current machine 36 is attached. Lead 37 extends between the machine 36 and the workpiece 38.

Helical spring 40 interposed between bushing 32 and an enlargement 42 of the upper guide tube 18 biases or urges the ramrod 24 upstream or in the direction opposite to the direction of movement of the electrode 16, thus maintaining the piston or reamer head 26 within the nozzle chamber 28 during operation of the welding torch.

When conventional torch switch 44 is actuated to close contact between leads 46 and 48 that extend to an appropriate electrical device for actuating the machine 36, welding current flows in the circuit established by the lead 34, bushing 32, lower guide tube 20 (which is preferably made of copper), the electrode, the arc 22, the workpiece 38, and the lead 37. The actual direction of current flow will, of course, depend upon the polarities involved. During operation of the torch, spring 40 maintains piston or ram head 26 in chamber or cavity 28 so that shielding gas entering the torch through handle 14 may flow down over the arc from the mouth of the nozzle.

As mentioned above, during the welding operation the minute globules of welding material, called weld spatter, become attached to the rounded surface 50 that defines the welding nozzle hole. This accumulation of welding spatter is diagrammatically illustrated at 52. Since welding torch nozzles are cooled during operation, circulating water being used to keep the nozzle from overheating, the welding spatter which accumulates in the hole of the mouth of the nozzle becomes only lightly attached to the nozzle and does not fuse to it.

In accordance with my invention, the weld spatter may be removed from the nozzle hole or mouth from the inside thereof merely by the operator pressing handle or knob 25 to compress spring 40 and force the piston or reamer head 26 into the nozzle mouth or hole, in the manner diagrammatically illustrated in Figure 2. Of course, the welding operation is stopped for cleaning the nozzle since the ring of metal spatter must drop free from around the electrode and over its end. However, when the principles of my invention are employed, the cleaning operation only requires a second or two.

Another embodiment of the invention is diagrammatically illustrated in Figures 4A and 4B wherein reference numeral 60 generally indicates a welding torch in which a ramrod 62 is reciprocally mounted, ramrod 62 being snugly but slidably received in torch head portion 142 that is made of material that is a good conductor of electricity. The electrode 16 is fed from the handle 63 of torch 60 into the ramrod intermediate of its ends through an elongated port 64 and thence passes through the torch nozzle 66 to the arc 22. The ramrod 62 includes a piston or reamer head 68, similar to piston or reamer head 26, secured in any suitable manner to the lower end thereof within the chamber or cavity 70 of nozzle 66.

At the rear end of the torch 60, the ramrod 62 extends outwardly or rearwardly of the torch through a flanged sleeve 71 that is formed with an L-shaped slot 72. Ramrod 62 carries a transversely extending pin 74 which operates in slot 72 whereby a bayonet type latching device is provided.

Torch 60 is operated in the usual manner during welding by the operator pressing conventional switch 75 to establish arc 22 by means of a circuit similar to that illustrated in Figure 1, shielding gas and water for cooling nozzle 66 being supplied in a manner later described.

When it is desired to clean the hole or mouth 76 of nozzle 66, it is merely necessary to grasp the knob or handle 78 of ramrod 62 and twist it so that the pin 74 moves to the left and out of portion 80 of slot 72. Handle or knob 78 is then pressed so that the piston or ram head 68 will be forced into the nozzle hole or mouth 76 to remove the weld spatter in the manner indicated in Figure 7. Of course, the welding operation is interrupted during the second or two that is required to operate ramrod 62, as by releasing switch 75.

As indicated in Figure 8, port 64 of ramrod 62 is sufficiently wide to permit the required turning action.

In the embodiment of Figure 1, the piston or ramrod head is returned to the nozzle cavity 28 by the action of spring 40, while in the embodiment of Figure 4A, it must be withdrawn by the operator and then the ramrod twisted to replace pin 74 in portion 80 of slot 72 whereby the ramrod 62 is locked in place.

Specific description

The body 12 of the embodiment of Figures 1 and 1a is composed of an appropriate form of insulating material, such as asbestos or spun glass fiber bonded with a resin such as Bakelite. It is formed with a longitudinally extending chamber 81, in the lower end of which the copper bushing 32 is firmly mounted and through which the reciprocable ramrod 24 extends. The handle 14 of the torch is formed with a passage 82 which receives shielding gas, such as carbon dioxide, from an appropriate source through appropriate conduit 84 that is secured in communication with the passage 82 by an appropriate fitting 86. The passage 82 communicates with chamber 81, and from chamber 81 the shielding gas passes through channels 88 formed in bushing 32 to annular passageway 90 that leads to chamber or cavity 28 formed in the nozzle. The shielding gas passes from the chamber or cavity 28 through the annular space between the piston or ram head 26 and the shoulder 92 of the nozzle into the hole or mouth of the nozzle defined by wall 50. The function of nozzle 30 is to direct an annular stream of shielding gas down over the surface of electrode 16, over the arc 22 and over the molten metal 39 on the workpiece, thus shielding all three from the harmful ambient air.

The nozzle 30, which is preferably formed from copper, is provided with an appropriate annular passageway 94 for water circulation purposes, water being supplied to the passageway 94 in any suitable manner, such as by an appropriate conduit 96 shown in Figure 1a. The water would be removed by an appropriate conduit 98.

The nozzle 30 being made of metal must be insulated from the welding current circuit, and therefore it is preferably screw threaded directly to the insulating welding torch body as at 100. At the rear of the torch, an insulating retainer cap 102, which may be formed from the same material as body 12, is preferably screw threadedly received on the body (against which portion 42 of upper guide tube 18 bears firmly under the action of spring 40). The upper guide tube 18 at its outermost end preferably carries a flexible insulating tube 104 of rubber or rubber like material which receives the electrode 16. Guide tube 18 also preferably includes an insulating sleeve 106 that is interposed between handle or knob 25 and enlargement 42.

Switch 44 in practice may be of any appropriate construction that will serve the functions required by this art. It will ordinarily include some biasing means such as a spring that normally urges switch member 107 away from contacts 109 so that the torch is operated by the operator pressing member 107 to turn on the welding current machine.

The piston or ram head 26 may conform in transverse cross sectional configuration to the configuration of the nozzle hole, be the latter round, as in the embodiment of Figure 1, or otherwise, or it may be formed with a plurality of grooves 110 extending longitudinally of the ramrod, as indicated in Figure 3 (if it is round). It will be appreciated that when the ramrod 24 is twisted during application of the piston or ram head to the nozzle hole or mouth, an excellent cleaning action is provided.

In the embodiment of Figures 4A and 4B, the torch 60 is made up of complementary halves 120 and 122 (formed from material similar to that from which body 12 of Figure 1 is formed) secured together in any suitable manner, as by screws 124 (see Figure 5). The halves 120 and 122 together form a torch body 125 and handle 63 and define a central chamber or cavity 126 through which the ramrod 62 extends. In the embodiment of Figures 4A and 4B, the electrode enters the gun at the bottom of the handle, instead of at the rear of the torch as in the embodiment of Figure 1, and the cavity or chamber 126 extends to the bottom of the handle portion of the torch.

Ramrod 62 comprises upper rod like element 130 screw threadedly connected to a lower guide tube 132, preferably made of copper, as at 134. Knob or handle 78 is secured to the member 130 by an appropriate pin 136, an insulating sleeve 138 being interposed between the end of member 71 and the knob or handle 78. Tube 132 is slidably but snugly received in torch head portion 142, which serves as a bushing means therefor.

The nozzle 66 is secured to the end of the torch by an appropriate sleeve like retainer 140 screw threadedly received on the end of the torch, an insulating gasket 141 being interposed between retainer 140 and head portion 142. Also, an insulating gasket 144 separates nozzle 66 and head portion 142. Gasket 144, which may be formed from neoprene, renders two functions, namely, it prevents water leakage at the nozzle cooling water connection later described and it electrically insulates the nozzle 55 from torch head portion 142.

The retainer 140 is thus removable from the torch, which permits replacement of the nozzle when this becomes desirable.

The nozzle 66, which is preferably made from copper, is formed with an annular passage 148 through which water is circulated for cooling purposes. Water is supplied to the passage 148 through intake tube 150 (see Figures 4B and 5), which is connected to a copper tube 152 that is in turn connected to passageway 154 which leads through head portion 142 to nozzle passageway 156 communicating with the nozzle cooling passage 148. Water leaves the passage 148 through nozzle passage 158 which communicates with channel 160 formed in head portion 142 that is in communication with copper tube 162 that leads to water outlet tube 164 (see Figures 4A, 4B, and 5).

Since the gas-shielded consumable-electrode arc welding processes require unusually high welding currents, it has become conventional practice to use a small electric cable to conduct current to the torch and increase the conductance of the cable by flowing water over its surface to avoid large and consequently heavy cables. In the illustrated embodiment, the electric cable 170 is received inside the water intake tube 150 and is silver soldered as at 171 to the end of tube 152 which is in turn silver soldered to head portion 142. The other end of the cable is electrically connected in a conventional manner to an appropriate form of welding current machine such as that diagrammatically illustrated in Figure 1. The circuit thus also includes the torch head portion 142 to which the tube 152 is connected, the lower guide tube 132 which is in contact with the electrode, the arc, the workpiece 38, and the lead, for instance, lead 37 of Figure 1, that is electrically connected to the welding current machine. Again, the exact current flow will depend on the polarities involved.

The electrode is conveyed to the welding torch through a tube 166, in which is mounted a nylon tube 168 that actually receives the electrode. Nylon being a self-lubricating material, the tube 168 provides for easy passage of the electrode therethrough and prolongs the useful life of tube 166. From the nylon tube 168 the electrode passes into a curved hardened steel tube 170 supported in any suitable manner within the torch. Brace member 172 secured in place by screws 174 may be employed to direct the electrode into the elongated port 64.

The port 64 is formed in the lower end of rod member 130, and is of sufficient length so that the ramrod 62 may be reciprocated sufficiently far enough so that piston 68 will perform its function. Appropriate proportions are indicated in Figure 4A.

As indicated in Figure 8, port 64 extends over approximately 90 degrees of the rod member 130 so that the ramrod may be twisted with respect to the electrode to release pin 74 from portion 80 of slot 72.

Shielding gas is supplied to the torch by a tube 180 that communicates with a tube 182 mounted in any suitable manner within the torch. Tube 182 in turn communicates with an appropriate channel 184 (see Figure 6) formed in torch head portion 142, which in turn communicates with passage 186 of the nozzle that conveys the gas to the chamber or cavity 70 of the nozzle from which it passes in an annular flow out of the nozzle and about the electrode, in the manner described above with respect to the embodiment of Figure 1.

The tubes 150, 164, 166 and 180 are necessarily preferably flexible and may be made of rubber reinforced with a layer of braided cotton cord. Tube 104 of Figure 1 is similarly constructed.

Figure 6 illustrates the manner in which weld spatter 52 accumulates in mouth 76 of nozzle 66, while Figure 7 illustrates how the piston or ram head 68 operates to remove the weld spatter 52.

The embodiment of Figures 4A-8 is preferred as it is made a better balanced tool by feeding the electrode into the torch through its handle and not at its top or rear end, as in the embodiment of Figure 1.

*Advantages of invention*

Figure 6 best illustrates the form weld spatter takes as it accumulates within the nozzle mouth and around the rim of the gas nozzle. The greatest amount of spatter accumulates just within the nozzle hole or mouth and around the rim 190 of the nozzle, the arrows 191 indicating the direction of movement of the small globules of metal from the workpiece. When spatter is removed with a pick or a separate reaming tool as in accordance with prior practices, the spatter must be picked off first from around the rim of the nozzle, which means that the removal action is from the outside in, and consequently can only be in small separate pieces. Many times after the outer rim of the spatter is removed, further picking or reaming from the outside pushes the remaining ring of spatter up into the nozzle, and then the ring of spatter must be crushed into small pieces in order to remove it from within the nozzle.

Figures 2 and 7 illustrate one of the principal values of my invention, as it is clearly shown that the removal of the spatter is from the inside out, and by pushing the ramrod against the spatter. I have found that only a single push of the ramrod against the spatter will remove the entire spatter mass, as indicated by Figures 2 and 7. Thus, in accordance with my invention, the splatter is removed quickly, thoroughly and with such little effort that welding operators do not hesitate in cleaning the nozzle as often as it should be cleaned to insure high quality welds.

In the appended claims, the term "substantially the same size" used in comparing the ramrod piston size with the size of the nozzle mouth is intended to cover pistons that are slightly smaller than the nozzle mouth.

The foregoing description and the drawings are given merely to explain and illustrate my invention, and the manner in which it may be performed, and the invention is not to be limited thereto, except insofar as the appended claims are so limited, since those skilled in the art who have my disclosure before them will be able to make modifications and variations therein without departing from the scope of the invention.

I claim:

1. In welding apparatus including a torch having a nozzle at one end thereof, and an electrode associated with the torch and extending outwardly thereof through said nozzle, the improvement wherein a tubular piston of substantially the same size as the nozzle opening is reciprocably mounted within the torch adjacent the nozzle and in alignment with the nozzle opening, said piston being received about the electrode, and wherein means is provided for forcing the piston into the nozzle opening to remove weld spatter and for withdrawing the piston from the opening.

2. A welding torch for consumable electrode arc welding apparatus comprising a body formed with a passageway through which the electrode passes to the arc, a nozzle carried by the body at the downstream end of the passageway and formed with an opening through which the electrode passes, a tubular ramrod reciprocably mounted in said passageway and slidably receiving the electrode, said ramrod terminating at one end inside the body adjacent the nozzle opening and extending outwardly of the body at the other end thereof, and a tubular piston carried by said ramrod adjacent said one end thereof, said piston being proportioned to approximate the width and configuration of said nozzle opening, whereby, when the ramrod is urged into said opening, weld spatter is removed from the nozzle.

3. A welding torch for consumable electrode arc welding apparatus comprising a body formed with a passageway through which the electrode passes to the arc, a nozzle carried by the body at the downstream end of the passageway and formed with an opening through which the electrode passes, a tubular ramrod reciprocably mounted in said passageway and slidably receiving the electrode, said ramrod terminating at one end inside the body adjacent the nozzle opening and extending outwardly of the body at the other end thereof, a tubular piston carried by said ramrod adjacent said one end thereof, said piston being proportioned to approximate the outline of said nozzle opening, and a handle carried by the other end of said ramrod, whereby, when the piston is urged into said opening, welding spatter accumulation is removed from the nozzle opening.

4. The welding torch set forth in claim 3 wherein said ramrod is biased in the direction away from the nozzle opening.

5. The welding torch set forth in claim 3 wherein latching means is associated with the torch body and the ramrod for holding the ramrod in retracted position.

6. A welding torch for gas shielded consumable electrode welding apparatus comprising a body formed with a passageway through which the electrode passes to the arc, a nozzle carried by the body at the downstream end of the passageway and formed with an opening through which the electrode passes, a tubular ramrod reciprocably mounted in said passageway and slidably receiving the electrode, said body including bushing means that in part defines said passageway, said ramrod being in sliding contact with said bushing means, said passageway being of enlarged proportions upstream of said bushing means, said bushing means being formed with channel means extending between the upstream and downstream sides thereof, gas conduit means communicating with the upstream ends of said channel means, the downstream ends of said channel means being in communication with said nozzle, said ramrod terminating at one end inside the body adjacent the nozzle opening and extending outwardly of the body at the other end thereof, a tubular reamer carried by said ramrod adjacent said one end thereof, said reamer being proportioned to approximate the outline of said nozzle opening, and a handle carried by the other end of said ramrod, whereby, when the reamer is urged into said opening, weld spatter accumulation is removed from the nozzle opening from the inside thereof.

7. The welding torch set forth in claim 6 wherein spring means acts between said tubular ramrod and said bushing means in the enlarged portion of said passageway to bias said reamer away from said nozzle opening.

8. The welding torch set forth in claim 6 wherein said body is formed with a handle that extends generally crosswise of said passageway, said electrode extending through said handle of said tubular ramrod.

9. The welding torch set forth in claim 6 wherein said body is formed with a handle that extends generally crosswise of said passageway, said body handle being formed with a passage that receives said electrode, said tubular ramrod being formed with a transversely opening port in the area of said passageway enlargement for receiving said electrode.

10. A welding torch for gas shielded consumable electrode welding apparatus comprising a body formed with a passageway through which the electrode passes to the arc, a nozzle carried by said body at the downstream end of the passageway and formed with an opening through which the electrode passes, said nozzle also being formed with an enlarged inner chamber axially aligned with said opening, a tubular ramrod reciprocably mounted in said passageway and slidably receiving the electrode, said body including bushing means that in part defines said passageway, said ramrod being in sliding contact with said bushing means, said ramrod terminating at one end adjacent said nozzle opening and extending outwardly of the body at the other end thereof, a tubular reamer carried by said ramrod in said nozzle chamber, said reamer being proportioned to approximate the outline of said nozzle opening, and a handle carried by the other end of said ramrod, whereby, when the reamer is urged into said opening from said nozzle chamber, weld spatter accumulation is removed from the nozzle opening.

11. A welding torch for gas shielded consumable welding apparatus comprising a body formed with a passageway through which the electrode passes to the arc, a nozzle carried by said body at the downstream end of the passageway and formed with an opening through which the electrode passes, said nozzle also being formed with an enlarged inner chamber axially aligned with said opening, a tubular ramrod reciprocably mounted in said passageway and slidably receiving the electrode, said body including bushing means that in part defines said passageway, said ramrod being in sliding contact with said bushing means, said ramrod terminating at one end adjacent said nozzle opening and extending outwardly of the body at the other end thereof, a tubular reamer carried by said ramrod in said nozzle chamber, said reamer being proportioned to approximate the outlet of said nozzle opening, and a handle carried by the other end of said ramrod, said passageway being of enlarged proportions upstream of said bushing means, said bushing means being formed with channel means extending between the upstream and downstream sides thereof, gas conduit means communicating with the upstream ends of said channel means, the downstream ends of said channel means being in communication with said chamber of said nozzle, whereby, when the reamer is urged into said opening from said nozzle chamber, weld spatter accumulation is removed from the nozzle opening from the inside thereof.

12. The torch set forth in claim 11 wherein means is provided for maintaining said reamer in said nozzle chamber during operation of the torch.

13. The torch set forth in claim 11 wherein the reamer is formed with a plurality of grooves along its periphery.

14. The torch set forth in claim 11 wherein said body is formed with a handle that extends generally crosswise of said passageway, said body handle being formed with a passage that receives said electrode, said tubular ramrod being formed with a transversely opening port to receive said electrode, said port being of sufficient axial length to permit said reciprocating movement of said ramrod, said port being sufficiently wide to permit substantial pivotal movement of said ramrod about its longitudinal axis.

References Cited in the file of this patent

UNITED STATES PATENTS

| | | |
|---|---|---|
| 2,659,796 | Anderson | Nov. 17, 1953 |
| 2,730,469 | Harwedd | Jan. 10, 1956 |
| 2,731,399 | Cummings | Jan. 17, 1956 |
| 2,761,049 | McElrath et al. | Aug. 28, 1956 |

U. S. DEPARTMENT OF COMMERCE
PATENT OFFICE

CERTIFICATE OF CORRECTION

Patent No. 2,833,913     Arthur A. Bernard            May 6, 1958

It is hereby certified that error appears in the printed specification of the above numbered patent requiring correction and that the said Letters Patent should read as corrected below.

Column 2, line 13, for "procedure as" read -- procedure is --; column 6, line 43, for "Nyon" read -- Nylon --; column 9, line 25, for "outlet" read -- outline --.

Signed and sealed this 8th day of July 1958.

(SEAL)
Attest:
KARL H. AXLINE
Attesting Officer

ROBERT C. WATSON
Commissioner of Patents